(12) United States Patent
Nishiyama

(10) Patent No.: US 11,816,864 B2
(45) Date of Patent: Nov. 14, 2023

(54) TRACKING DEVICE AND TRACKING METHOD FOR TRACKING AN OBJECT DISPLAYED ON A DISPLAY

(71) Applicant: CANON KABUSHIKI KAISHA, Tokyo (JP)

(72) Inventor: Tomohiro Nishiyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 17/475,208

(22) Filed: Sep. 14, 2021

(65) Prior Publication Data

US 2022/0092821 A1    Mar. 24, 2022

(30) Foreign Application Priority Data

Sep. 18, 2020 (JP) ................................ 2020-157096

(51) Int. Cl.
*G06T 7/80* (2017.01)
*G06T 7/73* (2017.01)
*G06F 3/01* (2006.01)
*H04N 23/63* (2023.01)

(52) U.S. Cl.
CPC ............... *G06T 7/80* (2017.01); *G06F 3/013* (2013.01); *G06T 7/73* (2017.01); *H04N 23/635* (2023.01); *G06T 2207/20084* (2013.01); *G06T 2207/30041* (2013.01)

(58) Field of Classification Search
CPC ... G06T 7/80; G06T 7/73; G06T 2207/20084; G06T 2207/30041; G06F 3/013; G06F 3/0346; H04N 23/635; H04N 23/56; H04N 23/65; H04N 23/667; H04N 23/672; G01S 5/16
See application file for complete search history.

(56) References Cited

U.S. PATENT DOCUMENTS

| | | | |
|---|---|---|---|
| 2015/0356743 A1* | 12/2015 | Kintou | G06T 7/248 382/103 |
| 2019/0014288 A1* | 1/2019 | Nishi | H04N 7/15 |
| 2019/0041642 A1* | 2/2019 | Haddick | G02B 27/0172 |
| 2019/0073768 A1* | 3/2019 | Shigeta | G16H 30/20 |

FOREIGN PATENT DOCUMENTS

JP        H05-53043 A    8/1991

* cited by examiner

*Primary Examiner* — Gevell V Selby
(74) *Attorney, Agent, or Firm* — Cowan, Liebowitz & Latman, P.C.

(57) ABSTRACT

A tracking device comprising at least one memory and at least one processor which function as: an acquisition unit configured to acquire a viewed position, which is a position on a display viewed by a user; a tracking unit configured to track an object displayed on the display; and a control unit configured to perform control processing to control the tracking unit based on a degree of irregularity of a change of the viewed position.

18 Claims, 10 Drawing Sheets

TRACKING DEVICE AND TRACKING METHOD FOR TRACKING AN OBJECT DISPLAYED ON A DISPLAY

BACKGROUND OF THE INVENTION

Field of the Invention

The present invention relates to a tracking device and a tracking method.

Description of the Related Art

Techniques, to detect a position at which a user is viewing (viewed position) in a display unit of an electronic apparatus, are known. For example, there is a technique to track a specific subject in video shooting in order to maintain focusing on the specific subject.

According to a technique disclosed in Japanese Patent Application Publication No. H5-53043, in a case where there is a difference between a position of a subject, which is being tracked in a video displayed on a display unit, and a viewed position by the user, the tracking target is changed to another subject located closer to the viewed position.

In the technique disclosed in Japanese Patent Application Publication No. H5-53043, however, a subject that the user did not intend to focus may be tracked if the user loses sight of the target subject during shooting in the state where a plurality of subjects are moving in the video.

SUMMARY OF THE INVENTION

With the foregoing in view, it is an object of the present invention to provide a tracking device that is capable of performing tracking control in accordance with the intention of the user.

An aspect of the invention is: a tracking device comprising at least one memory and at least one processor which function as: an acquisition unit configured to acquire a viewed position, which is a position on a display viewed by a user; a tracking unit configured to track an object displayed on the display; and a control unit configured to perform control processing to control the tracking unit based on a degree of irregularity of a change of the viewed position.

An aspect of the invention is: a tracking method executed by a tracking device, which includes a tracking unit that tracks an object displayed on a display, the method comprising: an acquisition step of acquiring a viewed position on the display which is a position viewed by a user; and a control step of performing control processing to control the tracking unit based on a degree of irregularity of a change of the viewed position.

Further features of the present invention will become apparent from the following description of exemplary embodiments with reference to the attached drawings.

DESCRIPTION OF THE EMBODIMENTS

Embodiments will be described with reference to the accompanying drawings. The following embodiments, however, are not intended to limit the present invention according to the Claims. Although a plurality of features are described in the embodiments, all of these features are not essential to the present invention. Further, these features may be freely combined. In the accompanying drawings, identical or similar composing elements are denoted with a same reference number, and redundant description thereof is omitted.

Embodiment 1

Figure 1:
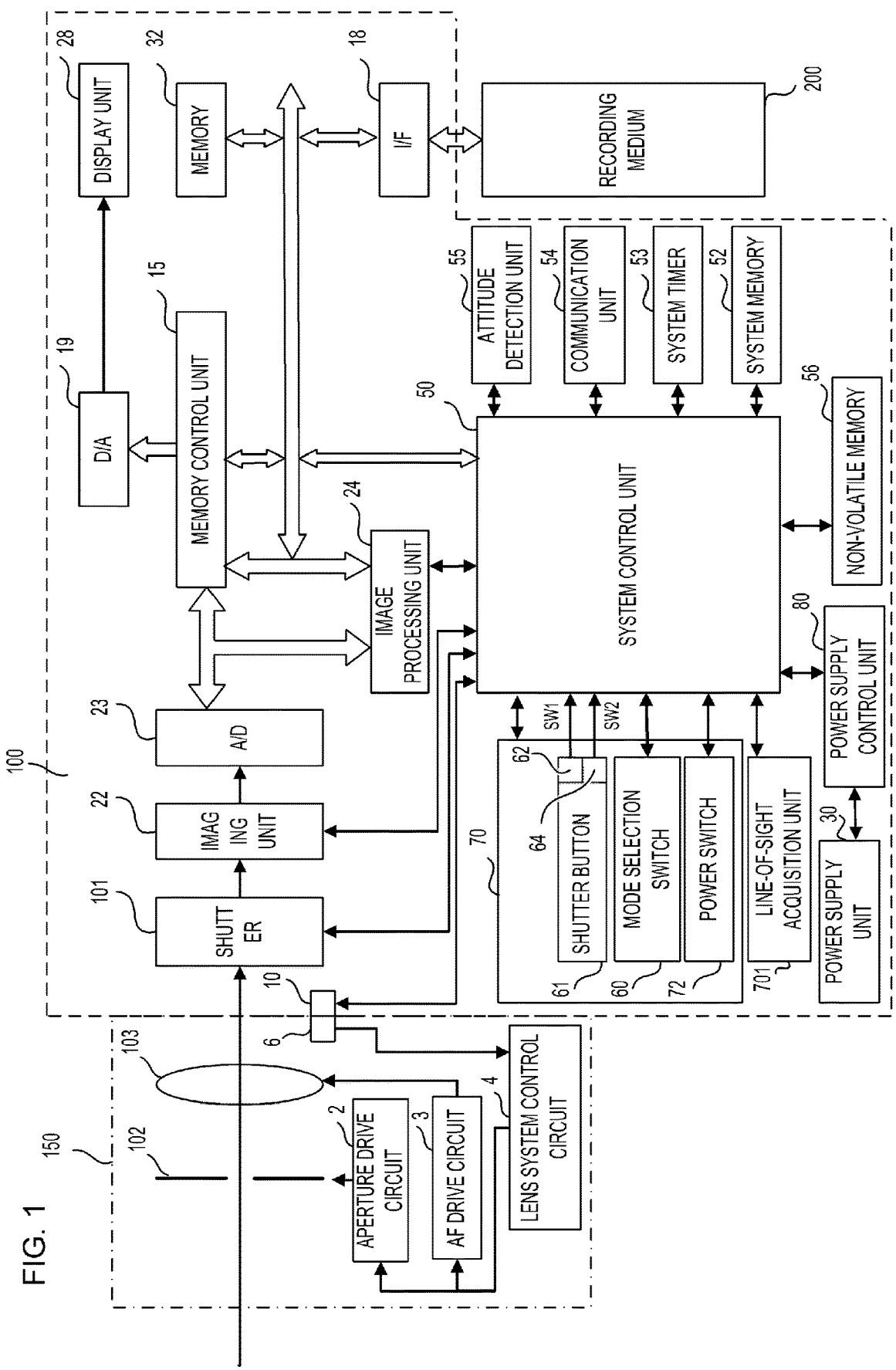
FIG. 1 is a block diagram of a digital camera according to Embodiment 1.

<Description of Configuration of Digital Camera> FIG. 1 is a block diagram depicting a configuration of a digital camera 100 (imaging apparatus) according to Embodiment 1. Instead of the digital camera 100, a tracking device (electronic apparatus) that can track a subject (object), such as a smartphone or PC (computer), that includes each composing element of the digital camera 100, may be used.

In FIG. 1, a lens unit 150 is a lens unit equipped with a replaceable image capturing lens. A lens 103 is normally constituted of a plurality of lenses, but is indicated here as one lens. A communication terminal 6 is a terminal for a lens unit 150 to communicate with the digital camera 100 side. A communication terminal 10 is a terminal for the digital camera 100 to communicate with the lens unit 150 side. The lens unit 150 communicates with a system control unit 50 via the communication terminals 6 and 10. The lens unit 150 also controls an aperture 102 using an internal lens system control circuit 4 via an aperture drive circuit 2. Further, the lens unit 150 performs focusing by moving the position of the lens 103 via an AF drive circuit 3. The lens system control circuit 4 stores information on the lens (e.g. information on focal distance).

A shutter 101 is a focal plane shutter which can freely control the exposure time of an imaging unit 22 based on the control by the system control unit 50.

The imaging unit 22 captures images of a subject via the aperture 102 and the lens 103. The imaging unit 22 is an image pickup element constituted of a CCD, a CMOS element, or the like, which converts an optical image into electric signals. The imaging unit 22 includes pixels generated by dividing a photoelectric conversion unit into a plurality of regions, and each pixel corresponds to one micro lens. Thereby light is divided and enters each pixel, and a phase difference detection signal can be acquired from the photoelectric conversion unit. The imaging unit 22 can also acquire an imaging signal by adding signals from each pixel. These pixels can play the dual roles of a focus detection pixel and an imaging pixel. The imaging unit 22 may have only the imaging pixels, and in this case, the focus detection may be implemented by a contrast method. In this way, the signals acquired by the imaging unit 22 may be used not only for image capturing, but also for the exposure control and the focus detection control.

An A/D convertor 23 converts analog signals outputted from the imaging unit 22 into digital signals. The A/D convertor 23 outputs the converted digital signals to an image processing unit 24 and a memory control unit 15 as images (videos).

The image processing unit 24 performs resize processing (predetermined pixel interpolation and demagnification processing) and color conversion processing on the image (data) outputted from the A/D convertor 23, or on the image outputted from the memory control unit 15. The image processing unit 24 also performs predetermined arithmetic processing using the captured images, and based on the result of this arithmetic processing, the system control unit 50 performs exposure control and distance measurement control. Thereby through-the-lens (TTL) type auto focus (AF) processing, auto exposure (AE) processing and pre-flash emission (EF) processing are implemented. Furthermore, the image processing unit 24 performs predetermined arithmetic processing using the captured images, and performs TTL type auto white balance (AWB) processing based on the result of the acquired arithmetic processing.

In this embodiment, the image processing unit 24 can perform the detection processing and tracking processing for a subject based on images (video; moving images). The internal configuration of the image processing unit 24, to perform the detection processing and tracking processing for a subject, will be described later with reference to FIG. 4.

The images (output data) outputted from the A/D convertor 23 are written to a memory 32 via the image processing unit 24 and the memory control unit 15, or via the memory control unit 15 alone. The memory 32 stores images which were captured by the imaging unit 22 and converted into digital signals by the A/D convertor 23, and also stores images to be displayed on the display unit 28. The memory 32 has a storage capacity that is sufficient to store a predetermined number of still images, and a predetermined duration of moving images and sounds.

The memory 32 is also used as a memory for image display (video memory). A D/A convertor 19 converts the digital signals of images for image display, which are stored in the memory 32, into analog signals, and supplies the analog signals to the display unit 28. In this way, the images for display, written in the memory 32, are supplied via the D/A convertor 19, and are displayed by the display unit 28.

The display unit 28 performs display on such a display as an LCD in accordance with the analog signals acquired from the D/A convertor 19. When the digital signals stored in the memory 32 are converted into analog signals by the D/A convertor 19 and sequentially transferred to the display unit 28, the display unit 28 performs live view (LV) display. Hereafter images displayed in the live view display are referred to as "live view images" (LV images). In the live view images, a subject, which the imaging unit 22 is currently capturing, is displayed.

The display unit 28 may be an electronic view finder to be looked into via an eye piece (not illustrated), or may be a display disposed on a rear face of the digital camera 100.

The display unit 28 may include both the electronic view finder and the display on the rear face.

A non-volatile memory 56 is a memory which is electrically erasable and recordable. For the non-volatile memory 56, an EEPROM or the like is used, for example. The non-volatile memory 56 stores constants, and programs, and the like, for operating the system control unit 50. For example, the non-volatile memory 56 stores programs for executing various flow charts which will be described later in this embodiment.

The system control unit 50 controls each composing element of the digital camera 100 by executing the programs stored in the non-volatile memory 56. A RAM is used for the system memory 52. The system control unit 50 can develop the constants and variables for operating the system control unit 50, and the programs read from the non-volatile memory 56, in the system memory 52. The system control unit 50 also performs display control by controlling the memory 32, the D/A convertor 19, the display unit 28, and the like. A system timer 53 is a clock unit that measures the time used for various controls and the time of the internal clock.

A power supply control unit 80 includes a battery detection circuit, a DC-DC convertor, a switch circuit to select blocks to be energized, and the like. The power supply control unit 80 detects whether a battery (power supply unit 30) is installed, a type of battery, and the residual amount of battery power. The power supply control unit 80 controls the DC-DC convertor based on this detection result and the instructions from the system control unit 50, and supplies the power of the power supply unit 30 to each composing element (including a recording medium 200). A power supply unit 30 includes a primary battery (e.g. alkali battery, manganese battery, Li battery), a secondary battery (e.g. NiCd battery, NiMH battery, Li battery), and AC adaptor, and the like.

A recording medium interface (I/F) 18 is an interface with the recording medium 200 (e.g. memory card, hard disk). The recording medium 200 is a recording medium to record captured images, such as a memory card. The recording medium 200 includes a semiconductor memory, a magnetic disk, or the like.

A communication unit 54 is connected with external devices via wireless communication or cable communication, and transmits/receives video signals and sound signals. The communication unit 54 is connectable with a network, such as an intranet and Internet. The communication unit 54 can transmits images captured by the imaging unit 22 (including a live view image) and images recorded in the recording medium 200. The communication unit 54 can also receive images and various other information from an external device.

An attitude detection unit 55 detects an attitude of the digital camera 100 with respect to the direction of gravity. Based on the attitude detected by the attitude detection unit 55, it can be determined whether an image captured by the imaging unit 22 is an image that was captured by the digital camera 100 held horizontally or an image that was captured by the digital camera 100 held vertically. The system control unit 50 can attach the orientation information, which is in accordance with the attitude detected by the attitude detection unit 55, to an image file of an image captured by the imaging unit 22, or can rotate and record the image. For the attitude detection unit 55, an acceleration sensor, a gyro sensor, or the like can be used. The motion of the digital camera 100 (e.g. pan, tilt, lift, still) can be detected if the acceleration sensor or gyro sensor of the attitude detection unit 55 is used. Further, the attitude detection unit 55 can detect a rotation angle γ around the z axis (yaw angle) of the digital camera 100 in the xyz space where the direction of gravity is the z axis direction. The attitude detection unit 55 can also detect a rotation angle β in the vertical direction of the digital camera 100 (pitch angle around they axis along the lateral direction of the digital camera 100). Furthermore, the attitude detection unit 55 can detect the rotation angle α in the lateral inclination direction of the digital camera 100 (roll angle around the x axis along the front/back direction of the digital camera 100).

An operation unit 70 includes a plurality of operation members that receive operation instructions from the user. For the operation members, the operation unit 70 includes buttons (e.g. menu button, SET button) and a four-direction key, in order to execute menu selection, mode selection, reproduction of captured moving image, and the like. For example, if the menu button is pressed, a menu screen, in which various settings can be performed, is displayed on the display unit 28. The user can intuitively perform various settings using the menu screen displayed on the display unit 28, the four-direction key and the SET buttons.

If a function icon is selected on the screen display on the display unit 28, each operation member of the operation unit 70 can be operated as a button (function button) to execute a function corresponding to the function icon. The function buttons are, for example, an end button, a return button, an image switching button, a jump button, a preview button and an attribute change button.

Furthermore, for the operation members, the operation unit 70 also includes a mode selection switch 60, a shutter button 61 and a power switch 72.

The mode selection switch 60 selects the operation mode of the system control unit 50 out of: a still image capturing mode, a moving image capturing mode, a reproduction mode, and the like. The modes included in the still capturing mode are: auto image capturing mode, auto scene determination mode, manual mode, aperture priority mode (Av mode), shutter speed priority mode (Tv mode), and program AE mode (P mode). Various scene modes and custom modes, in which image capturing settings can be performed for each image capturing scene, are also included. The user can directly select any one of these modes using the mode selection switch 60. The user may also select an image capturing mode list screen using the mode selection switch 60 first, then select any one of the plurality of modes displayed on the list using another operation member. In the same manner, a plurality of modes may be included in the moving image capturing mode.

The shutter button 61 includes a first shutter switch 62 and a second shutter switch 64. If the first shutter switch 62 is turned ON in mid-operation of the shutter button 61, that is, in the half-depressed state (image capturing preparation instruction), a first shutter switch signal SW1 is generated. By the generation of the first shutter switch signal SW1, the system control unit 50 starts the image capturing preparation operation, such as an auto focus (AF) processing, auto exposure (AE) processing, auto white balance (AWB) processing, and pre-flash emission (EF) processing.

If the second shutter switch 64 is turned ON when the operation of the shutter button 61 completes, that is, in the fully-depressed state (image capturing instruction), a second shutter switch signal SW2 is generated. By the generation of the second shutter switch signal SW2, the system control unit 50 starts a series of operations of the image capturing processing, from reading signals from the imaging unit 22 to writing the captured image to the recording medium 200 as an image file.

The power switch 72 is an operation member to switch the power supply of the digital camera 100 between ON/OFF.

Figure 2:
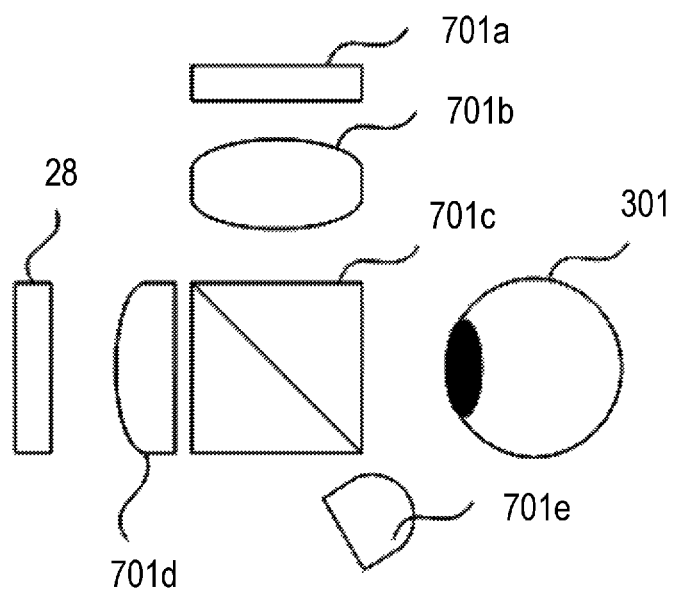
FIG. 2 is a diagram depicting an example of a configuration of a line-of-sight acquisition unit according to Embodiment 1.

A line-of-sight acquisition unit 701 detects (acquires) a position viewed by the user (viewed position; line-of-sight position) on the display unit 28. FIG. 2 indicates an example of the line-of-sight acquisition unit 701. The line-of-sight acquisition unit 701 include an image sensor 701a, a light-receiving lens 701b, a dichroic mirror 701c, an eyepiece 701d, an illumination light source 701e, and a control unit (not illustrated). In this state, a live view image captured via the lens unit 150 is displayed on the display unit 28.

In order to detect the viewed position of the user who is viewing the display unit 28 via the eyepiece 701d, the illumination light source 701e projects infrared light to the eyeball 301 first. The infrared light is reflected by the eyeball 301, and is further reflected by the dichroic mirror 701c. Then this infrared light transmits through the light-receiving lens 701b, and enters the image sensor 701a. Using the infrared light that entered the image sensor 701a, the image sensor 701a captures an image of the eyeball 301 and acquires an eyeball image. The control unit of the line-of-sight acquisition unit 701 extracts a region of the pupil and the like from the captured eyeball image. The control unit detects a rotation angle of the optical axis of the eyeball 301 of the user who looks into the finder visual field, and detects the line-of-sight of the user based on the detected rotation angle. Then the control unit detects a position (region) on the display unit 28 corresponding to the line-of-sight of the user (direction of the eye: direction the eye is viewing) as the viewed position. The line-of-sight acquisition unit 701 may capture an image of one eye of the user, or both eyes of the user.

Figure 3:
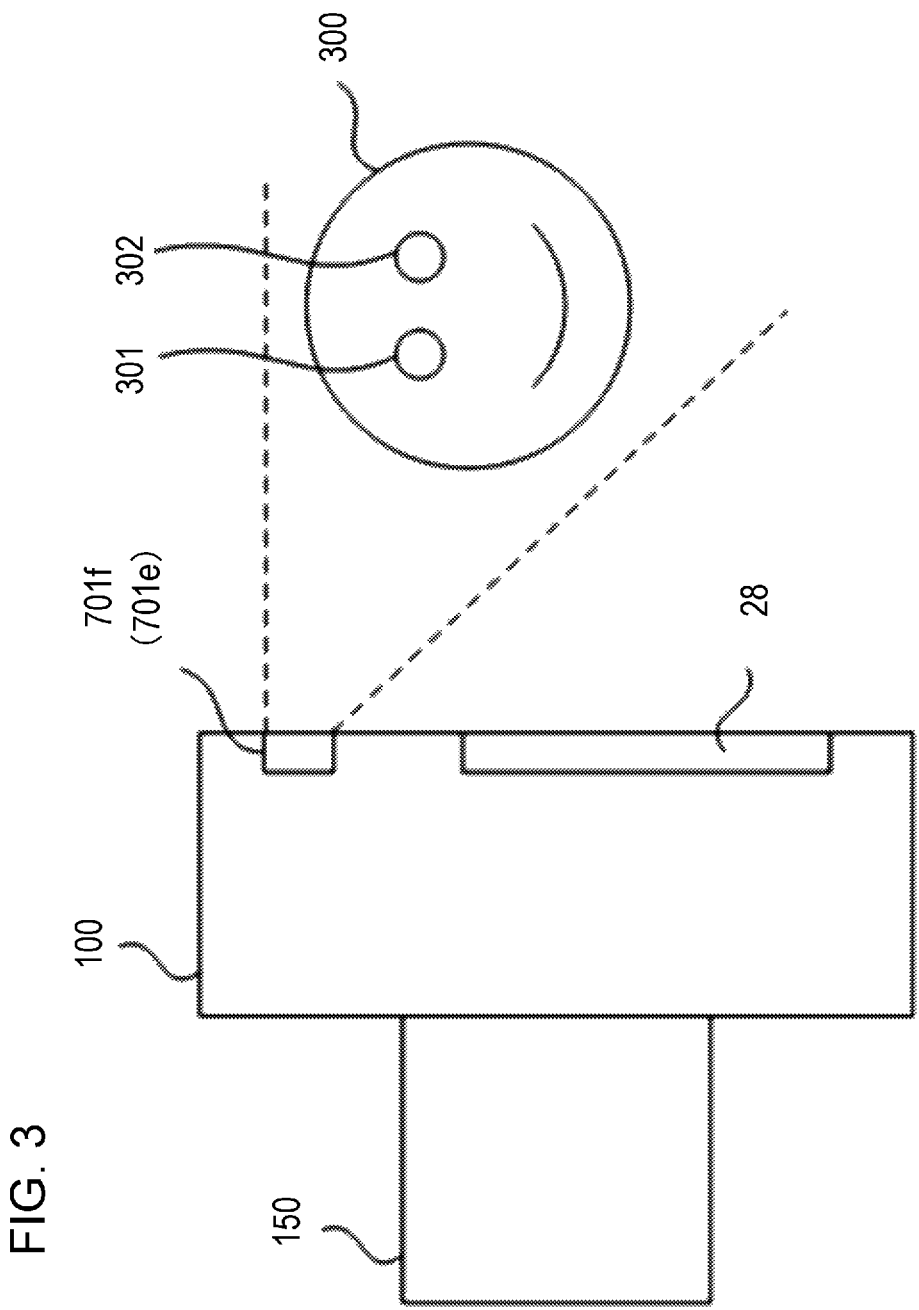
FIG. 3 is a diagram depicting an example of a configuration of a line-of-sight acquisition unit according to Embodiment 1.

FIG. 3 indicates another example of the line-of-sight acquisition unit 701 that is different from FIG. 2. Here the line-of-sight acquisition unit 701 includes a camera 701f, the illumination light source 701e, and a control unit. In FIG. 3, a live view image captured by the lens unit 150 is displayed on the display unit 28. In FIG. 3, the camera 701f, which captures an image of a face 300 (eyeballs 301 and 302) of the user observing the display unit 28, is provided on the rear face of the digital camera 100. In FIG. 3, a range where the camera 701f can capture an image is indicated by a broken line. When light is emitted from the illumination light source 701e to the face of the user, the camera 701f acquires an eyeball image (facial image). Then the control unit of the line-of-sight acquisition unit 701 detects the line-of-sight and the viewed position of the user from the eyeball image.

In either case of the line-of-sight acquisition units 701 in FIG. 2 and FIG. 3, the eyeball image may be converted into digital signals by an A/D convertor (not illustrated) and be sent to the system control unit 50. In this case, the system control unit 50 detects the viewed position based on the eyeball image. Therefore the configuration of the line-of-sight acquisition unit 701 is not limited to the configurations illustrated in FIG. 2 and FIG. 3, as long as the information to detect the line-of-sight (viewed position) of the user can be acquired.

Figure 4:
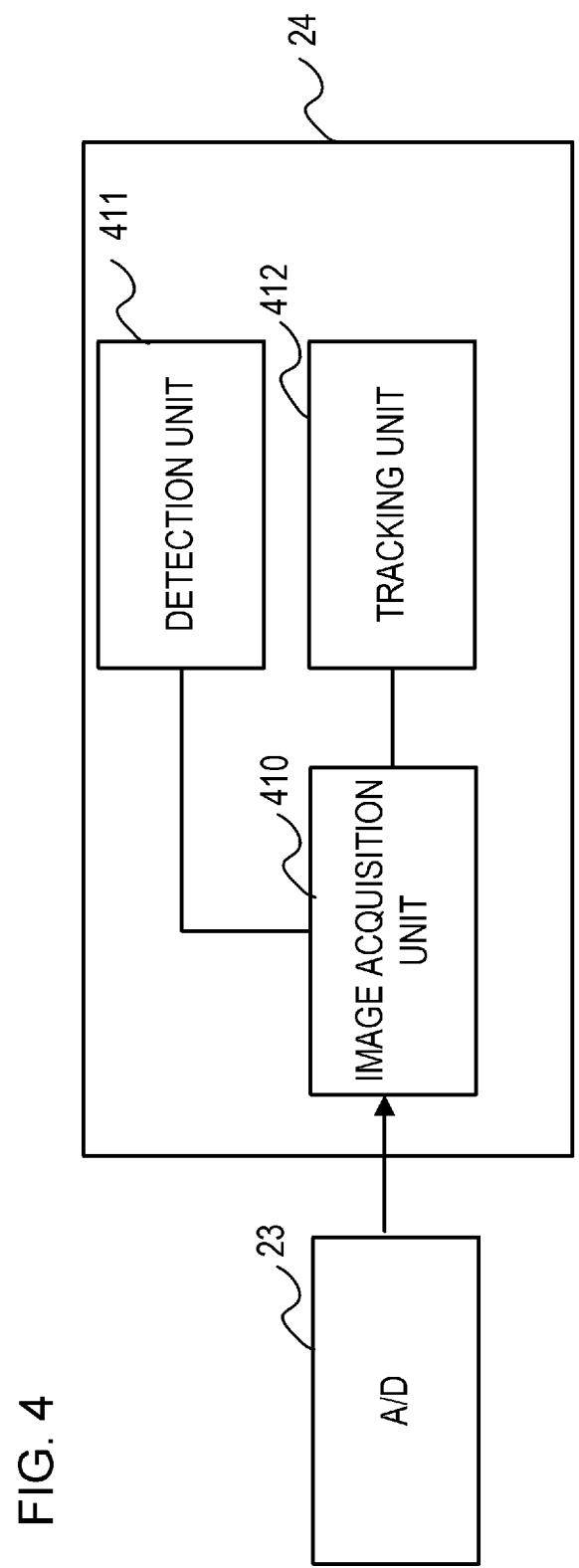
FIG. 4 is an internal block diagram of an image processing unit according to Embodiment 1.

(Image Processing Unit) A part of the internal configuration of the image processing unit 24 to detect or track a subject, will be described with reference to the block diagram in FIG. 4. The image processing unit 24 includes an image acquisition unit 410, a detection unit 411, and a tracking unit 412.

The image acquisition unit 410 acquires video (live view image) from the A/D convertor 23. The image acquisition unit 410 may not only acquire video from the A/D convertor 23, but also acquire video from an external device which is not the digital camera 100.

The detection unit 411 detects a subject (object) included in the video acquired by the image acquisition unit 410. The subject detected by the detection unit 411 is a subject (object) of a type which the user is likely to capture, such as a person, an animal and a vehicle. The subject detected by the detection unit 411 may be a subject of a type that the user selected in advance. The detection unit 411 can detect a subject using such a conventional method as a convolutional neural network.

The tracking unit 412 tracks a specified subject in the video displayed on the display unit 28. The tracking unit 412 can also acquire the position (x coordinate and y coordinate) of the subject that the tracking unit 412 is tracking in the video. The system control unit 50 can switch between executing and stopping the tracking of the subject by the tracking unit 412.

Figure 5:
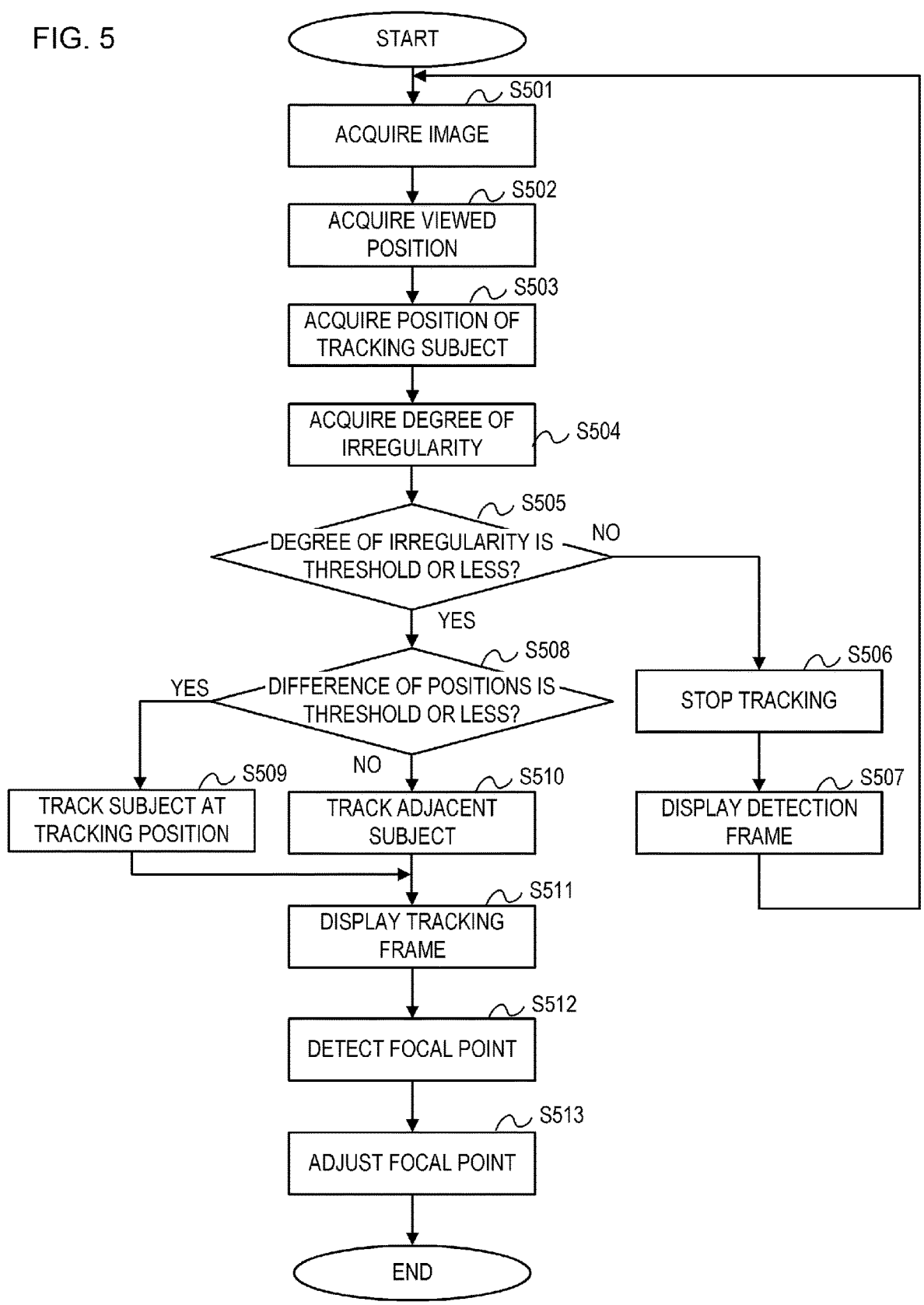
FIG. 5 is a flow chart of tracking processing according to Embodiment 1.

<Tracking Processing> Processing to control the tracking unit 412 to track a subject intended by the user (tracking processing; tracking method; method for controlling tracking device), will be described with reference to a flow chart in FIG. 5. The processing of this flow chart is implemented by developing programs, which are recorded in the non-volatile memory 56, in the system memory 52, and the system control unit 50 executing the programs. Here it is assumed that the tracking unit 412 is tracking one subject in the video before the start of this flow chart. At this time, a tracking frame that indicates the tracking subject is displayed on the display unit 28.

In S501, the system control unit 50 controls the image acquisition unit 410 and acquires video (live view image) from the A/D convertor 23. The image acquisition unit 410 may acquire the video from the memory 32 or the like, instead of acquiring the video from the A/D convertor 23.

In S502, the system control unit 50 acquires the viewed position of the user from the line-of-sight acquisition unit 701.

In S503, the system control unit 50 controls the tracking unit 412, and acquires a position (display position; position information) of the subject (tracking subject) which the tracking unit 412 is tracking in the video acquires by the image acquisition unit 410. In a case where the tracking unit 412 stops tracking the subject, the detection unit 411 acquires the current position of the subject which the tracking unit 412 was tracking at the point of stopping the tracking.

In S504, the system control unit 50 acquires a degree of irregularity of the locus of viewed position (line-of-sight) (viewed locus; change of the viewed position; change of line-of-sight). The method of acquiring the degree of irregularity of the viewed locus will be described later.

In S505, the system control unit 50 determines whether the degree of irregularity of the viewed locus is a predetermined threshold THr or less. In the case where the degree of irregularity of the viewed locus is the threshold THr or less, the viewed position is changing with regularity, hence the system control unit 50 determines that the line-of-sight of the user is tracking the subject. In the case where the degree of irregularity of the viewed locus is more than the threshold THr, on the other hand, the viewed position is changing with irregularity, hence the system control unit 50 determines that the user is not tracking the subject (user has lost sight of the subject). If the degree of irregularity of the viewed locus is the threshold THr or less, processing proceeds to S508. If the degree of irregularity of the viewed locus is more than the threshold THr, processing proceeds to S506.

In S506, the system control unit 50 controls the tracking unit 412, and stops the tracking by the tracking unit 412. Then the system control unit 50 stops the display of the tracking frame on the display unit 28. If the tracking by the tracking unit 412 has already stopped, the system control unit 50 executes no processing in S506.

In S507, the system control unit 50 controls the detection unit 411 and detects one or a plurality of subjects in the video, and displays a frame (detection frame) which indicates each one of the subjects on the display unit 28. The system control unit 50 need not necessarily display the detection frame, and may display each position of one or a plurality of subjects so that the user can easily recognize the position (highlight display). Thereby the user can easily recognize the position of each subject included in the video, and therefore the line-of-sight of the user can easily track the desired subject. At this time, the system control unit 50 may inform (notify) the user by sound or image that the viewed locus is irregular. When the processing in S507 ends, the processing in S501 to S505 is executed again. In other words, the system control unit 50 controls such that the tracking stop state continues and the detection frame indicating each subject is continuously displayed until the viewed locus changes with regularity.

In S508, the system control unit 50 determines whether a difference DF between the position of the subject acquired in S503 and the viewed position acquired in S502 is a predetermined threshold THp or less. In the case where the difference DF is the threshold THp or less, the system control unit 50 determines that the line-of-sight of the user is tracking the subject of which position was acquired in S503. In the case where the difference DF is more than the threshold THp, on the other hand, the system control unit 50 determines that the line-of-sight of the user is tracking a subject that is not the subject of which position was acquired in S503. If the difference DF is the threshold THp or less, processing proceeds to S509. If the difference DF is more than the threshold THp, processing proceeds to S510.

In S509, the system control unit 50 controls the tracking unit 412, and tracks the subject of which position was acquired in S503 (continuously tracks the subject).

In S510, the system control unit 50 determines that the user is tracking the subject closest to (or in the proximity of) the viewed position, and controls the tracking unit 412 so as to track the subject closest to the viewed position (subject in proximity) (changes the tracking subject).

In S511, the system control unit 50 displays, on the display unit 28, a tracking frame to indicate the subject which the tracking unit 412 is tracking.

Therefore in S509 and S510, the system control unit 50 determines that the subject corresponding to the viewed position is the main subject (subject that the user intends to track (image intended to capture)), and displays a tracking frame to indicate the subject corresponding to the viewed position, on the display unit 28, in S511.

In S512, the system control unit 50 selects a focus detection region closest to the tracking frame, and acquires (detects) the focus state (defocusing amount and direction thereof) using a signal acquired by the imaging unit 22 (phase difference detection signal).

In S513, the system control unit 50 calculates the lens driving amount and lens driving direction corresponding to the defocusing amount and defocusing direction acquired in S512. The system control unit 50 controls the position of the lens 103 in accordance with the calculated lens driving amount and lens driving direction, whereby the focal distance is adjusted and the imaging unit 22 is controlled to execute image capturing.

As described above, according to this embodiment, it is determined whether the line-of-sight of the user is tracking the subject or not based on the irregularity of the viewed locus, and based on this result, the tracking by the tracking unit 412 is controlled. If the degree of irregularity of the viewed locus is high (if it is determined that the line-of-sight of the user is not tracking the subject), the digital camera 100 stops tracking of the subject by the tracking unit 412, and displays the detection frame to indicate each subject included in the video. Therefore the possibility of tracking of the subject unintended by the user is suppressed in the digital camera 100, and tracking control in accordance with the intension of the user can be implemented.

Figure 6A:
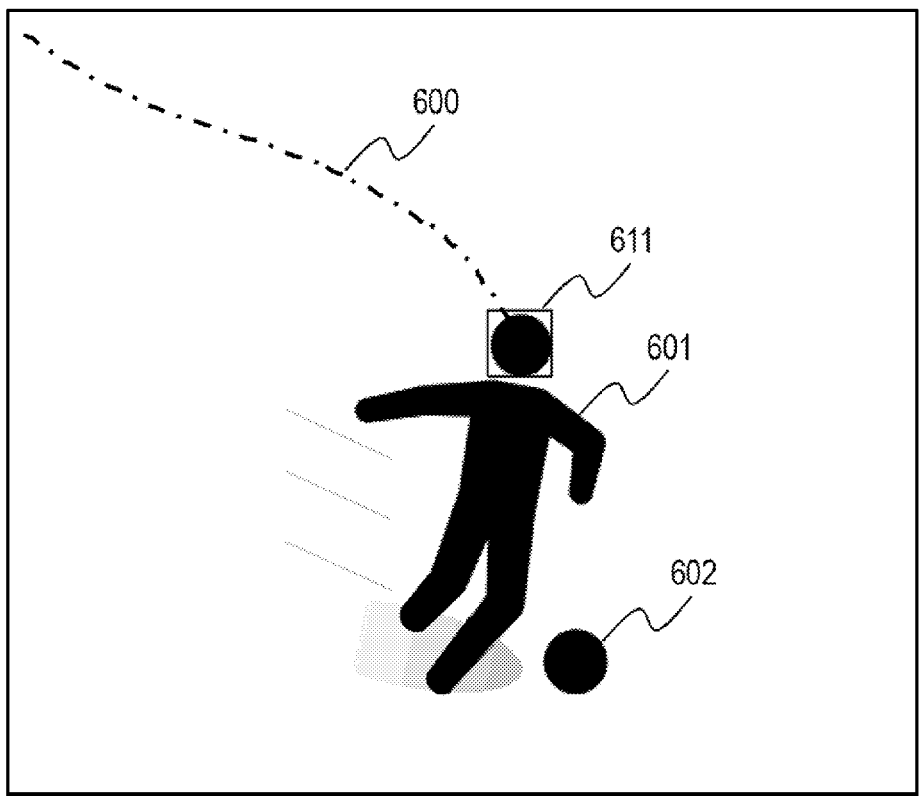
FIG. 6A is a diagram depicting a tracking frame according to Embodiment 1.
Figure 6B:
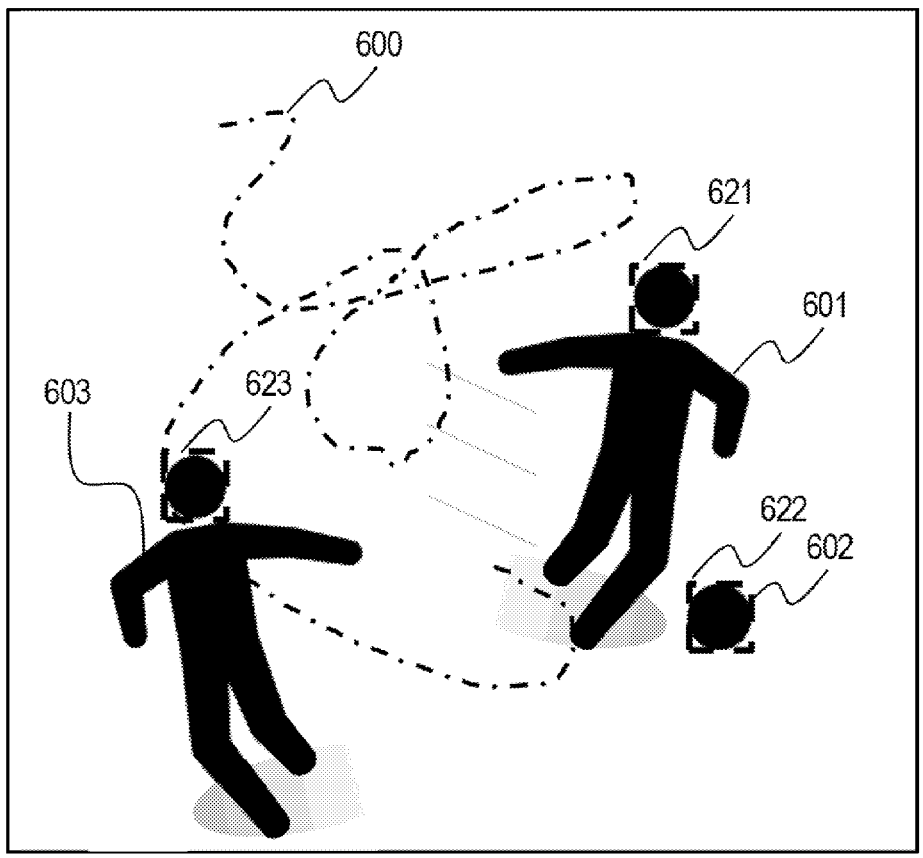
FIG. 6B is a diagram depicting a detection frame according to Embodiment 1.

<Display of Tracking Frame and Detection Frame> FIG. 6A and FIG. 6B are diagrams for describing display of the tracking frame and detection frame on the display unit 28. Here it is assumed that the digital camera 100 is capturing a sports scene. FIG. 6A and FIG. 6B indicate scenes where a person 601 and/or a person 603 are playing sports using a ball 602. Detection frames 621 to 623 are display items that indicate the subjects displayed on the video. A tracking frame 611 is a display item to indicate a subject that the digital camera 100 is tracking.

In FIG. 6A, the viewed locus 600 is regular (YES in S505), and the distance between the viewed position and the person 601 (subject) is short (YES in S508). Therefore it is more likely that the subject indicated by the tracking frame 611 and the subject that the user intends to capture (main subject) are both the person 601. In this case, in the display according to this embodiment, the tracking frame 611 tracks the person 601 (S509, S511), therefore the user can easily track the person 601 (main subject) continuously by viewing the tracking frame 611. At this time, the detection frame is not displayed so that the user can focus on tracking the target.

In FIG. 6B, on the other hand, the viewed position moves randomly and the degree of irregularity of the viewed locus 600 is high (NO in S505). In this case, it is more likely that the user has lost sight of the target subject (main subject) to be captured. Therefore the digital camera 100 stops display of the tracking frame 611, and displays the detection frames 621 to 623 which indicate the subjects included in the video (S507) so that the user can easily find the target subject (main subject) to be captured (S506). Thereby the user can find the main subject from the subjects indicated by the detection frames 621 to 623, and can find the main subject more easily compared with the case of not displaying the detection frames.

The system control unit 50 may be an arbitrary display item (e.g. a star symbol, circle) at the position of each subject, instead of the detection frame and the tracking frame, since critical here is that the user recognizes the position of each subject. The system control unit 50 may change the color and/or thickness between the tracking frame and detection frame displayed on the display unit 28. Further, the system control unit 50 may differentiate the display between the tracking frame and detection frame by another method. Thereby the user can more easily recognize which one: the detection frame and the tracking frame, is being displayed, and can more easily find the main subject.

<Viewed Locus Acquisition Processing> Processing (acquisition method; calculation method) to acquire the degree of irregularity of the viewed locus (change of viewed position) performed by the system control unit 50 will be described in detail.

(Case of Using Frequency to Acquire Degree of Irregularity) First a case of using frequency information of the viewed locus in the time axis direction, to acquire the degree of irregularity of the viewed locus, will be described. When time is t and the coordinates of the viewed position at each time is (x(t), y(t)), the result $X(\omega)$ of performing Fourier transform on x(t) and the result $Y(\omega)$ of performing Fourier transform on y(t) are given by the following Expression (1) and Expression (2).

$$X(\omega)=\Sigma_{k=0}^{N-1}x(t_k)\exp(-2\pi i(t_0+k\Delta t)\omega) \qquad \text{Expression 1)}$$

$$Y(\omega)=\Sigma_{k=0}^{N-1}y(t_k)\exp(-2\pi i(t_0+k\Delta t)\omega) \qquad \text{(Expression 2)}$$

Here $\Delta t$ is a time interval to acquire a viewed position, and frequency w is a frequency in a period from time to to time $t_0+N\Delta t$. As indicated in Expression 3, the power spectrum $P(\omega)$ is defined by a sum of a square of the absolute value of $X(\omega)$ and a square of the absolute value of $Y(\omega)$.

$$P(\omega)=|X(\omega)|^2+|Y(\omega)|^2 \qquad \text{(Expression 3)}$$

Figure 7:
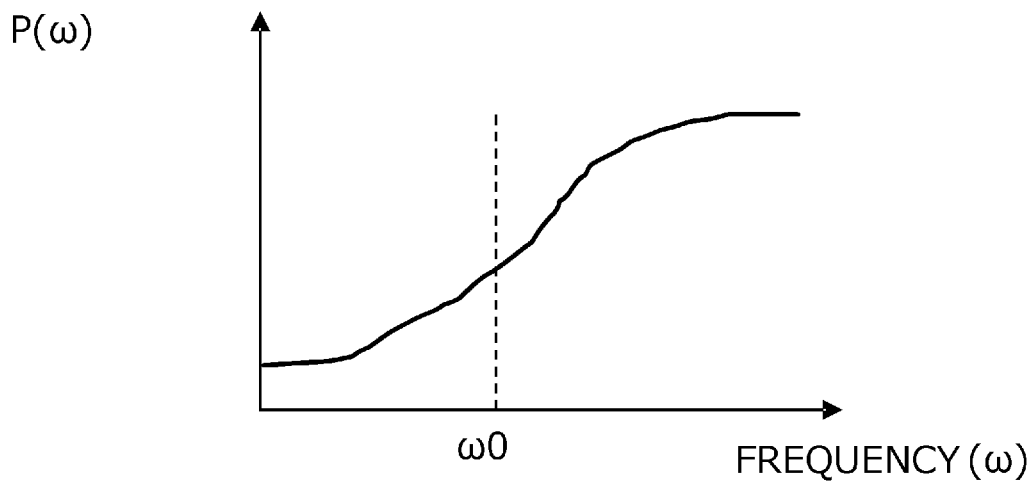
FIG. 7 is a graph indicating a power spectrum according to Embodiment 1.

In FIG. 7, the abscissa indicates the frequency w and the ordinate indicates the power spectrum $P(\omega)$. For the degree of irregularity, the system control unit 50 calculates the sum S of the power spectrum $P(\omega)$ that is not less than a predetermined frequency $\omega_0$. Then in S505, the system control unit 50 determines whether the sum S (degree of irregularity) is the threshold or less.

Figure 8:
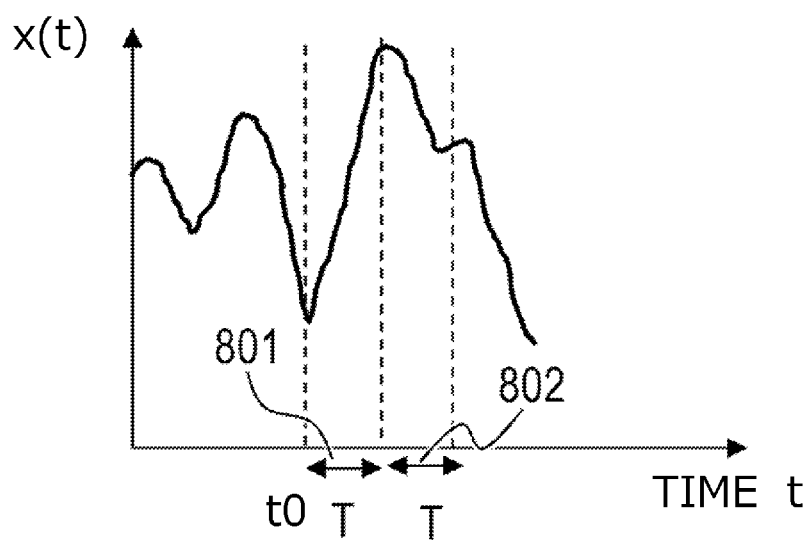
FIG. 8 is a graph indicating a viewed locus according to Embodiment 1.

(Case of Using Auto Correction for Degree of Irregularity) An example of using a value based on the auto correlation of the viewed locus for the degree of irregularity will be described next. FIG. 8 is a graph plotting x(t), which is an x position (x coordinate) of the viewed locus at time t with respect to the abscissa of time t. At time width 801 and time width 802, which are adjacent to each other, the auto correlation becomes close to 1 if the viewed locus is regular, and becomes closer to 0 if the view locus is random.

The absolute value R(T) of the auto correction is given by Expression 4. Here $\Delta t$ is a time interval to acquire the line-of-sight, and $T=N\Delta t$ is a width of time to calculate the correlation.

$$R(T)=|\Sigma_{k=0}^{N-1}x(t_0+k\Delta t+T)x(t_0+k\Delta t)|+|\Sigma_{k=0}^{N-1}y(t_0k\Delta t+T)y(t_0+k\Delta t)| \qquad \text{(Expression 4)}$$

In Expression 4, the auto correlation is determined for adjacent periods of time width T, but may be periods close to each other, even if the periods are not adjacent. The left side (x component) and the right side (y component) of Expression 4 may be added with weighting, instead of simply performing an addition. In S505, the system control unit 50 determines an inverse number of the absolute value R(T) of the auto correlation as the degree of irregularity of the viewed locus, and determines whether the degree of irregularity is the threshold or less, for example.

(Case of Using Other Information for Degree of Irregularity) For the degree of irregularity, representative values (mean value, mode or center value) of the velocity vector (vx, vy)=(dx/dt, dy/dt) of the line-of-sight or the magnitude of the acceleration vector (dvx/dt, vy/dt) in the time width T may be used as the degree of irregularity. Here d/dt indicates differentiation with respect to time t. The degree of irregularity of the viewed locus may be determined by arbitrarily combining the line-of-sight vector, the acceleration vector, the auto correlation, the frequency, and the like.

As described above, according to this embodiment, tracking in the digital camera 100 is controlled based on the degree of irregularity of the viewed locus. Thereby tracking in the digital camera 100, in accordance with the intention of the user, can be implemented.

Modification 1

To determine the degree of irregularity of the viewed locus, locus information on the position of the subject (display position) detected by the detection unit 411 may be used instead of the information on the viewpoint locus. For example, the system control unit 50 calculates the cross-correlation between a vector of the viewed locus at a certain time width $T=N\Delta t$ and a vector of the locus of the position of the subject. Then the system control unit 50 uses a value based on the absolute value of the cross-correlation (e.g. inverse number of the absolute value) between each vector of the locus of all the positions of the subject detected by the detection unit 411 and the vector of the viewed locus. For example, an inverse number of the largest value of the absolute values of the cross-correlation between each of the vector of the locus of the positions of the subject detected by the detection unit 411 and the vector of the viewed locus is regarded as the degree of irregularity of the viewed locus. In other words, in this modification, the viewed locus is determined as a regular locus conforming to the locus of the position of the subject, if the viewed position and the position of the subject are changing in the same way. Here the cross-correlation $R(t_0)$ in a period from time $t_0$ to time $t_0+N\Delta t$ is calculated by the following Expression 5.

$$R(t_0)=|\Sigma_{k=0}^{N-1}x_e(t_0+k\Delta t)x_o(t_0+k\Delta t)|+|\Sigma_{k=0}^{N-1}y_e(t_0+k\Delta t)y_o(t_0+k\Delta t)|$$ (Expression 5)

Here $(x_e(t), y_e(t))$ indicates a position of the viewpoint at time t. $(x_o(t), y_o(t))$ indicates a position of the subject at time t. The cross-correlation $R(t_0)$ as well may be calculated by a weighted addition of the x component (left side) and the y component (right side). Further, cross-correlation between the motion vector (velocity vector or acceleration vector) of the viewed position and the motion vector of the detected subject may be used.

Embodiment 2

A digital camera 100 according to Embodiment 2 changes whether the processing to determine execution of tracking described in Embodiment 1 (tracking control processing in S504 to S507) is performed or not, in accordance with the locus (change) of the position of the subject included in the video. This digital camera 100 will be described next. Furthermore, this digital camera 100 according to Embodiment 2 changes the threshold THr to determine irregularity of the viewed locus in S505, in accordance with the locus (change) of the subject included in the video.

For example, in a scene where a subject is moving with near regularity, it is easy for the user to continuously track this subject, and therefore the line-of-sight of the user is more likely to be tracking the subject indicated by the tracking frame. This means that it is probably appropriate for the tracking unit 412 to continue the current tracking, and the need to perform the tracking control processing according to Embodiment 1 is low.

Further, in a scene where a plurality of subjects move in various directions (e.g. sports scene), the degree of irregularity of the viewed locus tends to become high, even if the line-of-sight of the user is appropriately tracking the subject. Therefore in such a case, even if the line-of-sight of the user is tracking the subject moving in various directions, it may be determined in error that the line-of-sight of the user is not tracking the subject since the viewed position moves irregularly. In this case, it is better that the threshold THr, to determine the irregularity of the viewed locus, is larger than in other cases.

Figure 9:
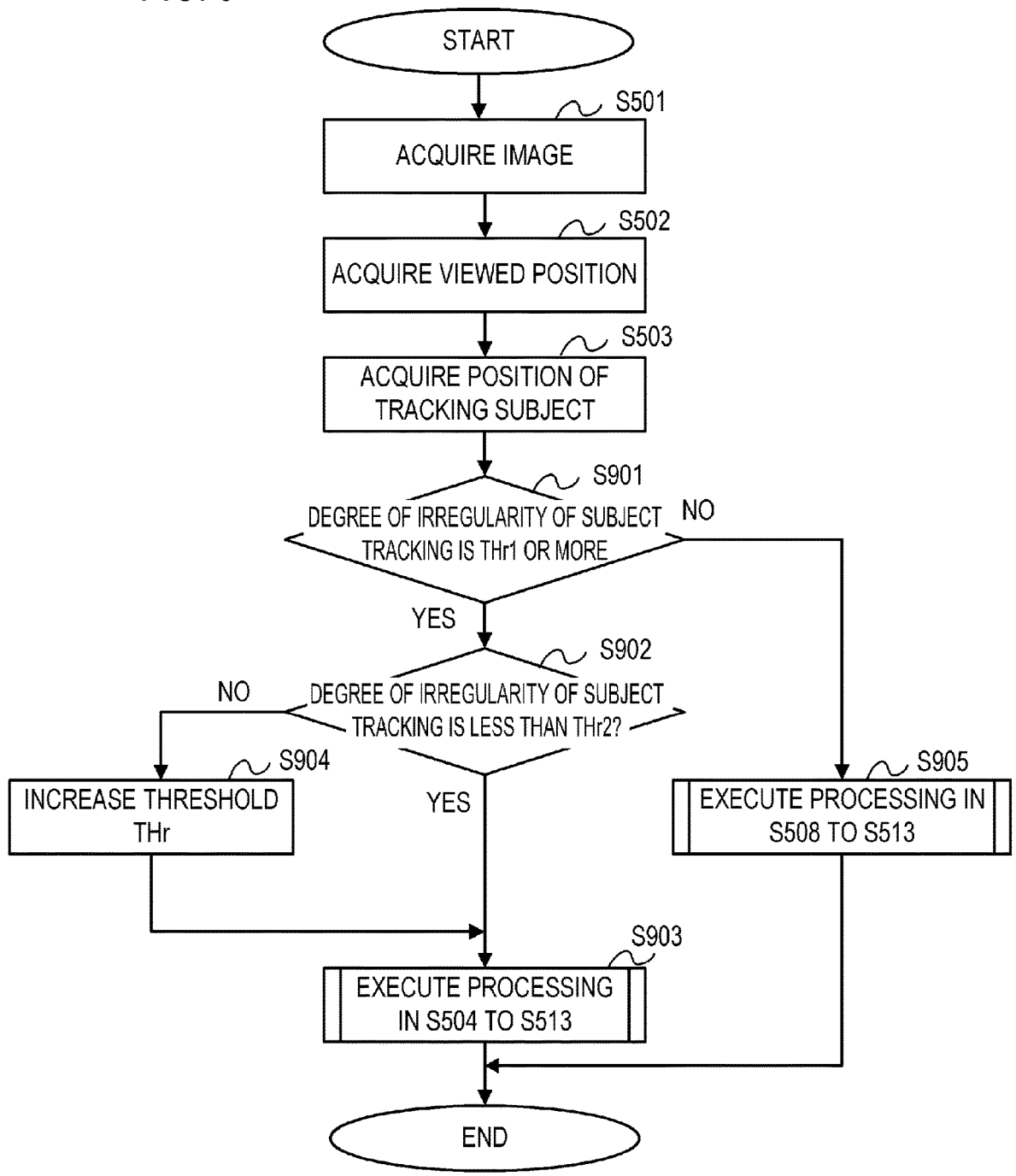
FIG. 9 is a flow chart of execution determination processing according to Embodiment 2.

<Execution Determination Processing> Processing to determine whether or not the tracking control processing is executed (execution determination processing) will be described with reference to the flow chart in FIG. 9. Description on the processing steps the same as Embodiment 1 will be omitted. In the case where a plurality of subjects are included in an image, "the degree of irregularity of the subject locus" in the following description should be interpreted as "the representative value (e.g. mean value, center value, mode) of the degree of irregularity of each locus of the positions of the plurality of subjects".

In S901, the system control unit 50 acquires (calculates) the degree of irregularity of the subject locus, and determines whether the degree of irregularity of the subject locus is a first threshold THr1 or more. The frequency of the subject locus, the auto correlation of the subject locus in the time direction, the velocity vector and the acceleration vector can be used to determine the degree of irregularity of the subject locus, in the same manner as the viewed locus according to Embodiment 1. In the case where the degree of irregularity of the subject locus is the first threshold THr1 or more (the threshold or more), processing proceeds to S902. And in the case where the degree of irregularity of the subject locus is less than the first threshold THr1 (less than the threshold), processing proceeds to S905.

In S902, the system control unit 50 determines whether the degree of irregularity of the subject locus is less than the second threshold THr2. Here the second threshold THr2 is a value larger than the first threshold THr1. In the case where the degree of irregularity of the subject locus is less than the second threshold THr2, processing proceeds to S903. In the case where the degree of irregularity of the subject locus is the second threshold THr2 or more, processing proceeds to S904.

In S903, the system control unit 50 executes the processing in S504 to S513 including the tracking control processing (S504 to S507). After the processing in S507 is executed, processing proceeds to S501 in this flow chart.

In S904, the system control unit 50 increases the threshold THr for the determination in S505 to be more than the case where S902 is YES (the case where the degree of irregularity of the subject locus is the first threshold THr1 or more, and less than the second threshold THr2). In this way, the system control unit 50 increases the threshold THr, which is a threshold to determine the irregularity of the viewed locus, if the degree of irregularity of the subject locus is high. Thereby in such a scene, where the subject moves irregularly, it becomes less likely to be determined in error that the line-of-sight of the user is not tracking the subject (NO in S505), even if the line-of-sight of the user is actually tracking the subject.

In S905, the system control unit 50 does not execute the tracing control processing (S504 to S507). This is because in the case where processing advanced to S905, the locus of the position of the subject is quite regular, and the line-of-sight of the user can easily track the subject, that is, it is unlikely that the user is not tracking the subject. Here the system control unit 50 executes processing in S508 to S513, which is processing other than the tracking control processing (S504 to S507).

As described above, according to Embodiment 2, the digital camera 100 changes whether or not the tracking control processing (S504 to S507) is executed, and changes the threshold THr to determine irregularity of the viewed locus, in accordance with the subject locus. Thereby the processing amount generated by unnecessary tracking control processing can be eliminated, and it can be appropriately determined whether or not the line-of-sight of the user is tracking the subject.

Embodiment 3

According to Embodiment 3, in the case where it is determined that the degree of irregularity of the viewed locus is high in S505 in Embodiment 1, the system control unit 50 determines the main subject (subject that the user intends to capture (track)), using a machine learning device included in the digital camera 100. Then the system control unit 50 tracks the determined main subject, and displays the tracking frame. The present invention is not limited to this, and the system control unit 50 may determine the main subject using the machine learning device, even if the viewed locus is regular (without determination in S505).

In the following, a case of using a neural network, which is a method of machine learning for the machine learning device, will be described, but such a regression procedure as linear (non-linear) regression may be used.

Figure 10:
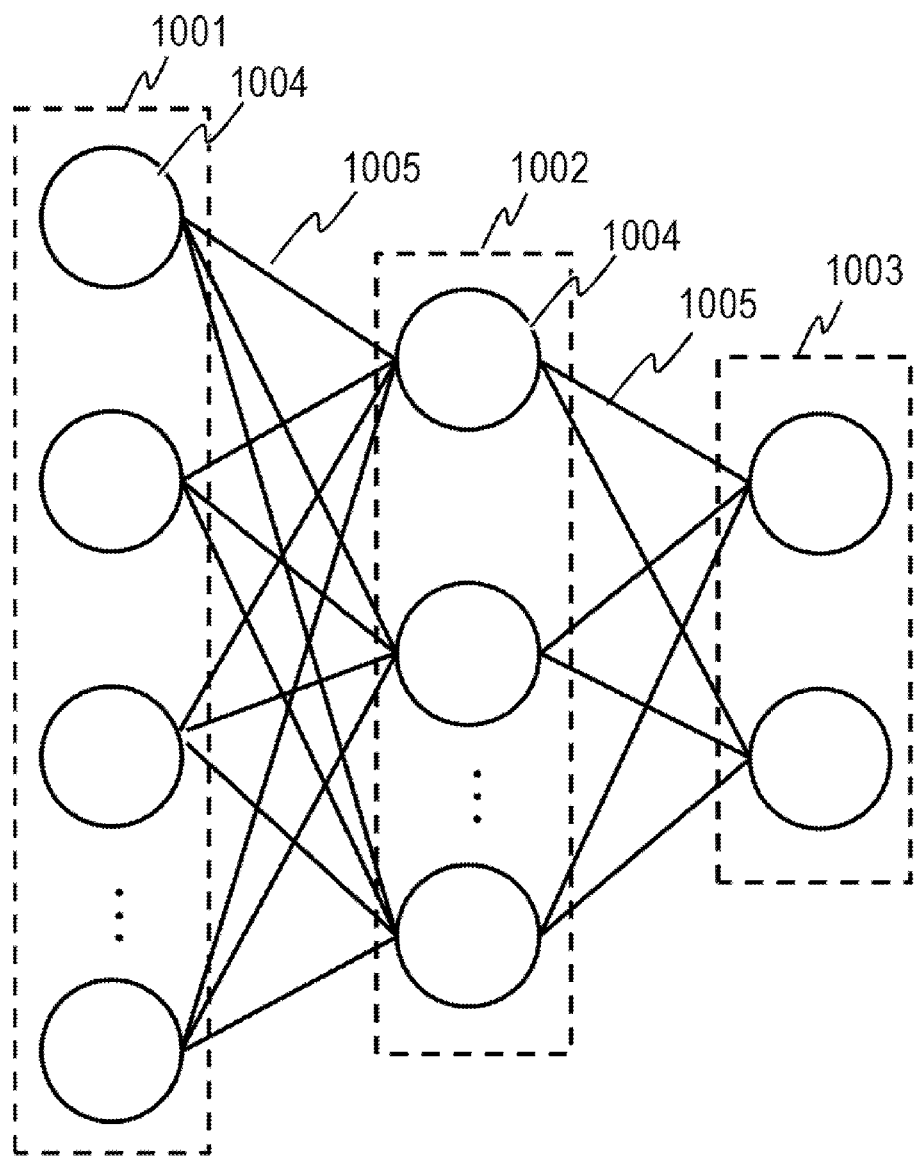
FIG. 10 is a diagram depicting a neutral network according to Embodiment 3.

FIG. 10 is a diagram depicting an example of a structure of a neural network. The neural network illustrated in FIG. 10 includes an input layer 1001, an intermediate layer 1002, an output layer 1003 and neurons 1004. Each connecting line 1005 indicates a connection relationship between neurons 1004. Here only representative neurons and connecting lines are numbered to simplify illustration. The system control unit 50 inputs data to the input layer 1001 of the neural network, and acquires data from the output layer 1003.

A number of neurons 1004 in the input layer 1001 is the same as a number of dimensions of the data to be inputted. The data that is inputted to the input layer 1001 includes the data of the viewed locus and the locus of the position of the subject. The output layer 1003 outputs 2 values (x coordinate and y coordinate) of the main subject in the video. Therefore a number of neurons 1004 in the output layer 1003 is 2. By the output of the 2 values (x coordinate and y coordinate) of the main subject, the system control unit 50 can determine the main subject.

A weight $w_{ji}$ is assigned to a connecting line 1005 connecting the i-th neuron 1004 in the input layer 1001 and the j-th neuron 1004 in the intermediate layer 1002. A value $z_j$, outputted by the j-th neuron 1004 in the intermediate layer 1002, can be calculated by the following Expression 6.

$$z_j = h(b_j + \Sigma_i w_{ji} x_i) \quad \text{(Expression 6)}$$

$$h(p) = \max(p, 0) \quad \text{(Expression 7)}$$

In Expression 6, $x_i$ indicates a value that is inputted to the i-th neuron 1004 in the input layer 1001. The i-th neuron 1004 is connected with the j-th neuron 1004 in the intermediate layer 1002. If N is a number of neurons 1004 in the input layer 1001, i is a value in the range of 1 to N. $b_j$ is called a "bias", and is a parameter that controls the ease of firing the j-th neuron 1004.

A function h(p) indicated in Expression 6 and Expression 7 is a function to output the larger of the value p and the value 0. In other words, the function h(p) is a function of which the output value always becomes 0 if the input value p in the function is 0 or less, and the output value becomes the same value p as the input value if the input value p is more than 0. The function h(p) is an activation function that is called a "rectified linear unit (ReLU)". For the activation function, such a function as a sigmoid function may be used.

The value $y_k$ outputted by the k-th neuron 1004 in the output layer 1003 can be calculated by the following Expressions 8. Here k in Expression 8 is a value of 1 or 2. k=1 indicates the neuron 1004 which outputs a value of the x coordinate of the main subject, and k=2 indicates a neuron 1004 which outputs a value of they coordinate of the main subject.

$$y_k = f(b_k + \Sigma_j w_{kj} z_j) \quad \text{(Expression 8)}$$

In Expression 8, $z_j$ indicates a value that is outputted by the j-th neuron 1004 in the intermediate layer 1002. If M is a number of all the neurons 1004 in the intermediate layer 1002 which are connected with the k-th neuron 1004 in the output layer 1003, j is a value in the range of 1 to M.

The function f is assumed to be an identity mapping function. Since the coordinate values of the image are always positive, ReLU used for Expression 7 may be used for the function f. Further, in Embodiment 3, only the coordinate values normalized to [0, 1] are handled, as mentioned later, hence a sigmoid function may be used for the function f.

Here the input data and the correct answer data are provided as learning data to perform learning in the neural network. For example, viewed loci when a person views a plurality of scenes are recorded in advance, and the viewed loci and the locus of the position of the subject at each point are used as the input data to input to the input layer 1001. The volume of the learning data may be artificially increased by a data augmentation technique. Each of the recorded loci is normalized to the range of [0, 1] in advance, in accordance with the lateral width and the longitudinal width of the video (image), so as to eliminate the influence of the size of the image. The correct answer data, as the learning data, indicates the correct answer coordinates (x coordinate and y coordinate) normalized on the image of the main subject. A scene to be the learning target is preferably a scene in which irregularity of the viewed loci is likely to be detected (e.g. scene where a plurality of subjects cross with each other), but a scene where tracking by the line-of-sight is easy may be included.

When learning is performed, all the weight and bias values are optimized so as to minimize the loss function L, which indicates the degree of irregularity between the coordinates outputted based on the input data (locus of viewed position and locus of position of the subject) and the correct answer coordinate. For the loss function L, a square sum error function, as indicated in the following Expression 9, can be used.

$$L(y,t) = \tfrac{1}{2} \Sigma_k (y_k - t_k)^2 \quad \text{(Expression 9)}$$

In Expression 9, the subscript k indicates a coordinate component, k=1 indicates the x coordinate, and k=2 indicates the y coordinate. $y_k$ indicates a normalized coordinate value outputted from the neuron 1004 in the output layer 1003. $t_k$ indicates a coordinate value of the normalize correct answer of the main subject. By optimizing based on Expression 9, the weights and bias values can be determined so that the correct answer coordinates and the outputted coordinate values becomes closer to each other.

The loss function L may be an arbitrary function as long as the function can indicate the degree of mismatch (degree of match) between the outputted coordinate values and the correct answer coordinates.

The learned weights and bias values are stored in the non-volatile memory 56 in advance, and are then stored in the memory 32 as required. Thus by using the learned weights and bias values, the neural network outputs the normalized coordinate values $(y_1, y_2)$ of the main subject based on Expression 5 to Expression 8.

As described above, according to Embodiment 3, the main subject can be determined by using the viewed locus and the locus of the subject. If the main subject can be accurately determined, the digital camera 100 can track (capture) the subject intended by the user.

Embodiment 4

When the user frequently moves the position of the digital camera 100, it is likely that the user has lost sight of the main subject. Further, the user is more likely to lose sight of the subject immediately after panning or when a telephoto lens is used. Therefore in Embodiment 4, the digital camera 100 changes whether or not the tracking control processing (processing in S504 to S507) is executed, based on the motion information of the digital camera 100 and information on the lens.

Figure 11:
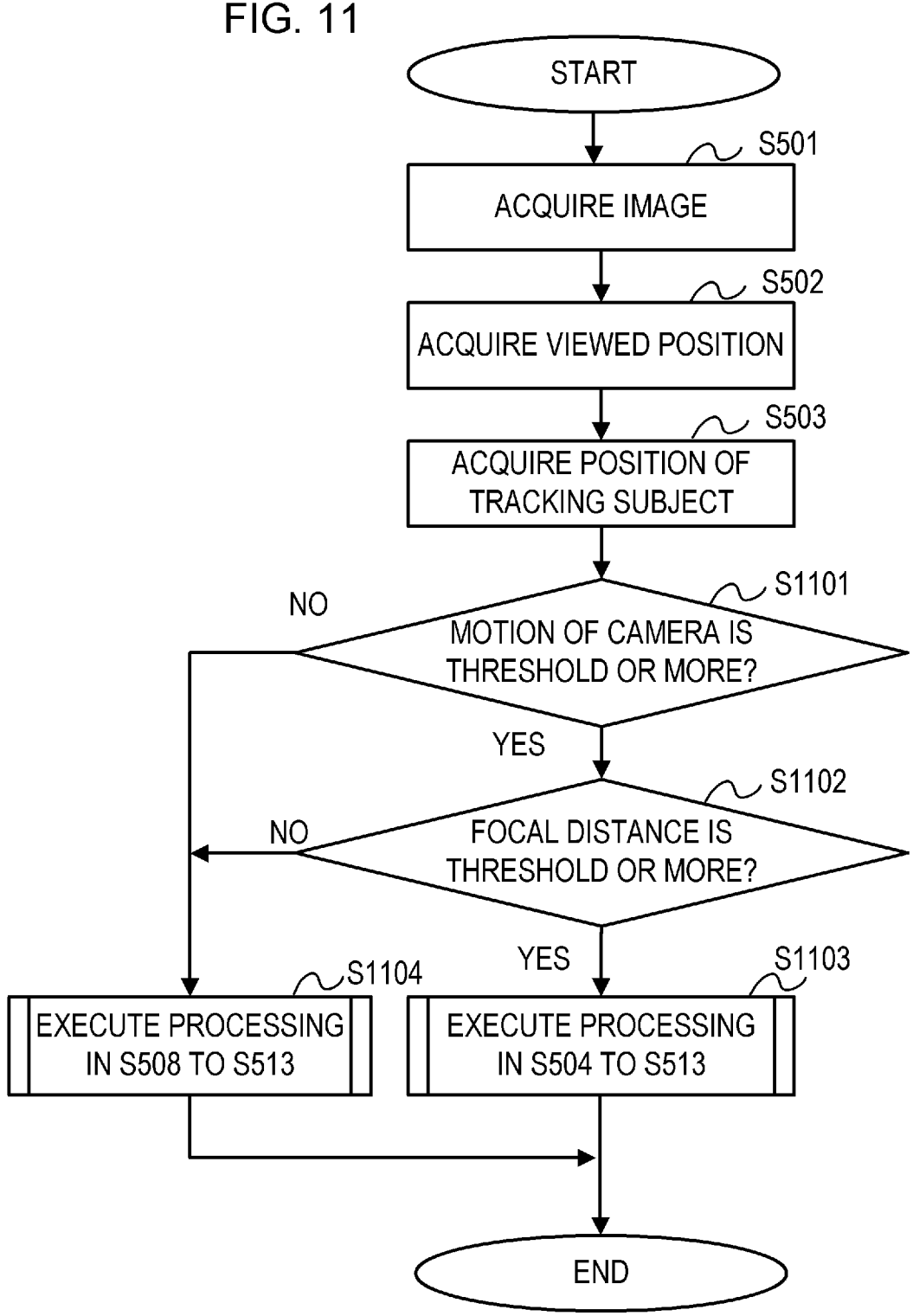
FIG. 11 is a flow chart of execution determination processing according to Embodiment 4.

<Execution Determination Processing> Processing to determine whether the tracking control processing is performed or not (execution determination processing) will be described with reference to the flow chart in FIG. 11. Description on the processing steps the same as Embodiments 1 and 2 will be omitted.

In S1101, the system control unit 50 determines whether the motion amount of the digital camera 100, detected by the attitude detection unit 55, is a threshold THcam or more. In the case where the motion amount of the digital camera 100 is the threshold THcam or more, processing proceeds to S1102. In the case where the motion amount of the digital camera 100 is less than the threshold THcam, processing proceeds to S1104.

For this motion amount of the digital camera 100, a change in the angle of the digital camera 100 (e.g. pitch angle, yaw angle, roll angle) that can be detected by the attitude detection unit 55 can be used. The motion amount of the digital camera 100 may be a moving amount (shift amount) of the digital camera 100 in the horizontal direction, the vertical direction, the diagonal direction, and the like. Instead of the motion amount of the digital camera 100, a number of times when the motion amount exceeded a predetermined threshold within a certain time may be used. This means that as the number of times when the motion amount exceeded the predetermined threshold is higher, the user is moving the digital camera 100 more frequently. Therefore in this case, in S1101, the system control unit 50 determines whether the number of times when the motion amount of the digital camera 100 exceeded the predetermined threshold, detected by the attitude detection unit 55, is the threshold THcam or more.

In S1102, the system control unit 50 acquires information on the focal distance of the lens, from the lens system control circuit 4, and determines whether the focal distance is a threshold THd or more. In the case where the focal distance is the threshold THd or more, processing proceeds to S1103. In the case where the focal distance is less than the threshold THd, processing proceeds to S1104.

In S1103, the system control unit 50 executes the processing in S504 to S513, including the tracking control processing (S504 to S507) of Embodiment 1. In the case where processing proceeds to S1103, it is likely that a telephoto lens is being used because the focal distance is long, and that the motion of the digital camera 100 is large, that is, it is easy for the user to lose sight of the subject. Therefore it is preferable to execute the tracking control processing based on the degree of irregularity of the viewed locus. After the processing in S507 is executed, processing proceeds to S501 in this flow chart.

In S1104, the system control unit 50 executes the processing in S508 to S513 where the tracking control processing of Embodiment 1 is not included.

In Embodiment 4, the tracking control processing in S504 to S507 is executed only in the case where the motion amount of the digital camera 100 is the threshold THcam or more and the focal distance is the threshold THd or more. However, the tracking control processing may be executed in the case where at least one of the conditions is met: the motion amount of the digital camera 100 is the threshold THcam or more; and the focal distance is the threshold THd or more. Further, just like Embodiment 2, the system control unit 50 may change the level of the threshold THr to determine the irregularity of the viewed locus in S505, in accordance with the motion and focal distance of the camera.

As described above, by changing whether the tracking control processing is executed or not in accordance with the motion of the camera and information on the lens, the main subject can be appropriately determined while reducing processing amount.

According to the present invention, a tracking device that is capable of performing the tracking control in accordance with the intention of the user can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-157096, filed on Sep. 18, 2020, which is hereby incorporated by reference herein in its entirety.

What is claimed is:

1. A tracking device comprising:
a processor; and
a memory storing a program which, when executed by the processor, causes the tracking device to:
acquire a viewed position, which is a position on a display corresponding to line-of-sight of a user;
track an object displayed on the display; and
perform control processing to control the tracking based on a degree of irregularity of a change of the viewed position.

2. The tracking device according to claim 1, wherein in a case where the degree of irregularity of the change of the viewed position is more than a first threshold, the tracking is controlled so that an object is not tracked.

3. The tracking device according to claim 2, wherein in the case where the degree of irregularity of the change of the viewed position is more than the first threshold, the display is controlled to highlight each object displayed on the display.

4. The tracking device according to claim 3, wherein in the case where the degree of irregularity of the change of the viewed position is more than the first threshold, the display is controlled to display a display item indicating each object displayed on the display, independently of the viewed position.

5. The tracking device according to claim 2, wherein in the case where the degree of irregularity of the change of the viewed position is more than the first threshold, control is performed so that the user is notified that the change of the viewed position is irregular.

6. The tracking device according to claim 1, wherein in a case where the degree of irregularity of the change of the viewed position is a first threshold or less, the tracking is controlled to track an object corresponding to the viewed position.

7. The tracking device according to claim 6, wherein in the case where the degree of irregularity of the change of the viewed position is the first threshold or less, the display is controlled to display a display item, which indicates an object being tracked.

8. The tracking device according to claim 2, wherein in a case where a degree of irregularity of a change of a display position of the object is a second threshold or more, the first threshold is increased to be more than a case where the degree of irregularity of the change of the display position of the object is less than the second threshold and is not less than a third threshold, which is smaller than the second threshold.

9. The tracking device according to claim 1, wherein using a machine learning device with which machine learning was performed to determine an object that the user intends to track with line-of-sight, an object that the user intends to track with line-of-sight is determined based on the change of the viewed position.

10. The tracking device according to claim 9, wherein in a case where an object is tracked, the tracking is controlled to track an object determined using the machine learning device.

11. The tracking device according to claim 1, wherein the degree of irregularity of the change of the viewed position is a value based on at least one of: frequency of the change of the viewed position, auto correlation of the change of the viewed position, velocity of the change of the viewed position and acceleration of the change of the viewed position.

12. The tracking device according to claim 1, wherein the degree of irregularity of the change of the viewed position is a value based on cross-correlation between a change of a display position of the object and the change of the viewed position.

13. The tracking device according to claim 1, wherein it is determined whether the control processing is performed or not, based on a degree of irregularity of a change of a display position of the object.

14. The tracking device according to claim 13, wherein the control processing is not performed in a case where the degree of irregularity of the change of the display position of the object is less than a third threshold.

15. The tracking device according to claim 1, wherein it is determined whether the control processing is performed or not, based on information on motion of an imaging apparatus that images the object.

16. The tracking device according to claim 1, wherein it is determined whether the control processing is performed or not, based on information on a focal distance of an imaging apparatus that images the object.

17. A tracking method executed by a tracking device that tracks an object displayed on a display, the method comprising:
an acquisition step of acquiring a viewed position on the display which is a position corresponding to line-of-sight of a user; and
a control step of performing control processing to control the tracking based on a degree of irregularity of a change of the viewed position.

18. A non-transitory computer-readable storage medium that stores programs to execute a tracking method executed by a tracking device that tracks an object displayed on a display, wherein
the tracking method includes:
an acquisition step of acquiring a viewed position which is a position on the display corresponding to line-of-sight of a user; and
a control step of performing control processing to control the tracking based on a degree of irregularity of a change of the viewed position.

* * * * *